US009286135B2

(12) United States Patent
Das et al.

(10) Patent No.: US 9,286,135 B2
(45) Date of Patent: *Mar. 15, 2016

(54) PROVISIONING AGGREGATE COMPUTATIONAL WORKLOADS AND AIR CONDITIONING UNIT CONFIGURATIONS TO OPTIMIZE UTILITY OF AIR CONDITIONING UNITS AND PROCESSING RESOURCES WITHIN A DATA CENTER

(71) Applicant: INTERNATIONAL BUSINESS MACHINES CORPORATION, Armonk, NY (US)

(72) Inventors: Rajarshi Das, Armonk, NY (US); Hendrik F. Hamann, Yorktown Heights, NY (US); Vanessa Lopez-Marrero, Yorktown Heights, NY (US); Andriy Stepanchuk, Wappingers Falls, NY (US); Srinivas Yarlanki, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/684,648

(22) Filed: Nov. 26, 2012

(65) Prior Publication Data

US 2013/0103218 A1  Apr. 25, 2013

Related U.S. Application Data

(63) Continuation of application No. 13/280,887, filed on Oct. 25, 2011.

(51) Int. Cl.
*G06F 9/00* (2006.01)
*G06F 9/50* (2006.01)
(Continued)

(52) U.S. Cl.
CPC .............. *G06F 9/5094* (2013.01); *G05B 11/01* (2013.01); *G06Q 10/04* (2013.01); *G06F 1/206* (2013.01); *G06F 1/3203* (2013.01)

(58) Field of Classification Search
None
See application file for complete search history.

(56) References Cited

U.S. PATENT DOCUMENTS 6,862,179 B2 *  3/2005  Beitelmal et al. ........ 361/679.53
7,031,870 B2 *  4/2006  Sharma et al. ................ 702/130
(Continued)

OTHER PUBLICATIONS

Bash, "Balance of Power: Dynamic Thermal Management for Internet Data Centers", HPL-2003-5, Hewlett-Packard Laboratories Technical Report, Feb. 18, 2003, pp. 1-14, Hewlett-Packard, Palo Alto, California, USA.

(Continued)

*Primary Examiner* — Christopher E Everett
(74) *Attorney, Agent, or Firm* — Edward J. Lenart; Grant A. Johnson; Kennedy Lenart Spraggins LLP

(57) ABSTRACT

Methods, apparatuses, and computer program products for provisioning aggregate computational workloads and air conditioning unit configurations to optimize utility of air conditioning units and processing resources within a data center are provided. Embodiments include for each air conditioning unit within the data center, determining a thermal zone generated by the air conditioning unit; for a given aggregate computational workload, identifying a plurality of computational workload configurations, each computational workload configuration indicating spatial assignments of the aggregate computational workload among a plurality of processing resources within the data center; for each computational workload configuration, calculating a total minimum energy consumption of the air conditioning units and the processing resources; and selecting the computational workload configuration with the lowest total minimum energy consumption and the determined lowest power air conditioning unit configuration corresponding with the selected computational workload configuration.

6 Claims, 9 Drawing Sheets

(51) Int. Cl.
*G05B 11/01* (2006.01)
*G06Q 10/04* (2012.01)
*G06F 1/20* (2006.01)
*G06F 1/32* (2006.01)

(56) References Cited

U.S. PATENT DOCUMENTS

| | | | |
|---|---|---|---|
| 7,197,433 B2 | 3/2007 | Patel et al. | |
| 7,251,547 B2 * | 7/2007 | Bash et al. | 700/276 |
| 7,313,924 B2 * | 1/2008 | Bash et al. | 62/178 |
| 7,447,920 B2 | 11/2008 | Sharma et al. | |
| 7,644,148 B2 * | 1/2010 | Ranganathan et al. | 709/223 |
| 7,818,594 B2 * | 10/2010 | Gorbatov et al. | 713/320 |
| 7,995,339 B2 * | 8/2011 | Bash et al. | 361/692 |
| 8,145,927 B2 * | 3/2012 | Okitsu et al. | 713/320 |
| 8,301,315 B2 * | 10/2012 | Dawson et al. | 700/300 |
| 8,650,420 B2 * | 2/2014 | Kato et al. | 713/320 |
| 2003/0193777 A1 * | 10/2003 | Friedrich et al. | 361/687 |
| 2006/0112286 A1 * | 5/2006 | Whalley et al. | 713/300 |
| 2007/0078635 A1 * | 4/2007 | Rasmussen et al. | 703/1 |
| 2007/0250838 A1 * | 10/2007 | Belady et al. | 718/105 |
| 2007/0271475 A1 * | 11/2007 | Hatasaki et al. | 713/324 |
| 2008/0065919 A1 * | 3/2008 | Hatasaki et al. | 713/324 |
| 2009/0119233 A1 * | 5/2009 | Dunagan et al. | 705/412 |
| 2009/0228893 A1 | 9/2009 | Behrendt et al. | |
| 2009/0254660 A1 * | 10/2009 | Hanson et al. | 709/226 |
| 2010/0057641 A1 * | 3/2010 | Boss et al. | 705/412 |
| 2010/0058350 A1 * | 3/2010 | Boss et al. | 718/104 |
| 2010/0211669 A1 * | 8/2010 | Dalgas et al. | 709/224 |
| 2010/0223385 A1 * | 9/2010 | Gulley et al. | 709/226 |
| 2010/0333105 A1 * | 12/2010 | Horvitz et al. | 718/105 |
| 2011/0022870 A1 * | 1/2011 | McGrane et al. | 713/340 |
| 2011/0035078 A1 * | 2/2011 | Jackson | 700/300 |
| 2011/0077795 A1 * | 3/2011 | VanGilder et al. | 700/300 |
| 2011/0131431 A1 * | 6/2011 | Akers et al. | 713/320 |
| 2012/0065788 A1 * | 3/2012 | Harper, III et al. | 700/291 |
| 2012/0130554 A1 * | 5/2012 | Jain et al. | 700/291 |
| 2012/0278045 A1 * | 11/2012 | Saigo et al. | 703/1 |

OTHER PUBLICATIONS

Bash, "Integrated Management of Cooling Resources in Air-cooled Data Centers", 6th annual IEEE Conference on Automation Science and Engineering, Aug. 2010, pp. 1-6, Toronto, Ontario, Canada.

Bash; "Dynamic Thermal Management of Air Cooled Data Centers", Intersociety Conference on Thermal and Thermomechanical Phenomena in Electronic Systems, 2006, pp. 1-8, San Diego, CA.

* cited by examiner

PROVISIONING AGGREGATE COMPUTATIONAL WORKLOADS AND AIR CONDITIONING UNIT CONFIGURATIONS TO OPTIMIZE UTILITY OF AIR CONDITIONING UNITS AND PROCESSING RESOURCES WITHIN A DATA CENTER

CROSS-REFERENCE TO RELATED APPLICATION

This application is a continuation application of and claims priority from U.S. patent application Ser. No. 13/280,887, filed on Oct. 25, 2011.

BACKGROUND OF THE INVENTION

1. Field of the Invention

The field of the invention is data processing, or, more specifically, methods, apparatuses, and computer program products for provisioning aggregate computational workloads and air conditioning unit configurations to optimize utility of air conditioning units and processing resources within a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area that software is being used is in the controlling of energy consumption of computing systems. In particular, energy consumption has become a critical issue for data centers, triggered by the rise in energy costs, volatility in the supply and demand of energy and the widespread proliferation of power-hungry information technology (IT) equipment. In data centers, myriad integrating physical components such as power distribution units, power supplies, water air conditioning units, and air conditioning units interact not just with one another, but also with the software components, resulting in a management problem that is both qualitatively similar to and quantitatively harder than that of managing computer hardware alone.

SUMMARY OF THE INVENTION

Methods, apparatuses, and computer program products for provisioning aggregate computational workloads and air conditioning unit configurations to optimize utility of air conditioning units and processing resources within a data center are provided. Embodiments include for each air conditioning unit within the data center, determining, by a configuration optimizer, a thermal zone generated by the air conditioning unit; for a given aggregate computational workload, identifying, by the configuration optimizer, a plurality of computational workload configurations, each computational workload configuration indicating spatial assignments of the aggregate computational workload among a plurality of processing resources within the data center; for each computational workload configuration, calculating, by the configuration optimizer, a total minimum energy consumption of the air conditioning units and the processing resources, wherein calculating a total minimum energy consumption includes determining a lowest power air conditioning unit configuration of the air conditioning units that enables each air conditioning unit to consume the least amount of energy while maintaining a real-time inlet temperature of the air conditioning unit's thermal zone within a predetermined temperature range; and selecting, by the configuration optimizer, the computational workload configuration with the lowest total minimum energy consumption and the determined lowest power air conditioning unit configuration corresponding with the selected computational workload configuration.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
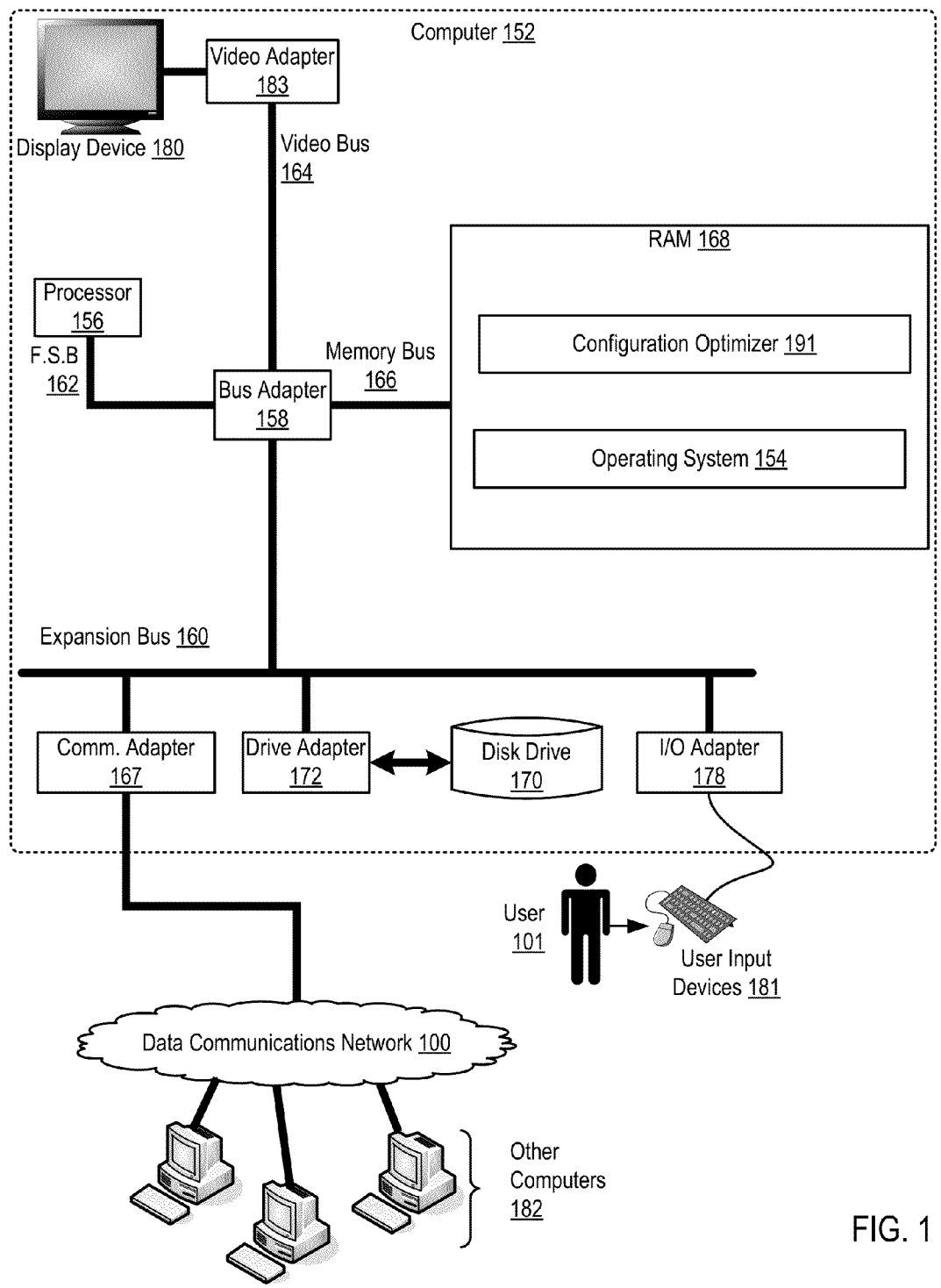
FIG. 1 sets forth a block diagram of automated computing machinery comprising an exemplary computer useful in provisioning aggregate computational workloads and air conditioning unit configurations to optimize utility of air conditioning units and processing resources within a data center according to embodiments of the present invention.

Exemplary methods, apparatuses, and computer program products for provisioning aggregate computational workloads and air conditioning unit configurations to optimize utility of air conditioning units and processing resources within a data center in accordance with the present invention are described with reference to the accompanying drawings, beginning with FIG. 1. Provisioning aggregate computational workloads and air conditioning unit configurations to optimize utility of air conditioning units and processing resources within a data center in accordance with the present invention is generally implemented with computers, that is, with automated computing machinery. FIG. 1 sets forth a block diagram of automated computing machinery comprising an exemplary computer (152) useful in provisioning aggregate computational workloads and air conditioning unit configurations to optimize utility of air conditioning units and processing resources within a data center according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a configuration optimizer (191) that includes computer program instructions for provisioning aggregate computational workloads and air conditioning unit configurations to optimize utility of air conditioning units and processing resources within a data center. The configuration optimizer (191) includes computer program instructions that when executed by the processor (156) cause the computer (152) to carry out the step of: for each air conditioning unit within the data center, determining, by the configuration optimizer (191), a thermal zone generated by the air conditioning unit. An air conditioning unit may include a computer room air-conditioning unit (CRAC). A thermal zone is a region of a data center that a particular air conditioning unit cools.

The configuration optimizer (191) also includes computer program instructions that when executed by the processor (156) cause the computer (152) to carry out the step of identifying, for a given aggregate computational workload by the configuration optimizer (191), a plurality of computational workload configurations. Identifying computational workload configurations may include identifying one or more known configurations, determining all possible configurations, or any variation thereof as will occur to one of skill in the art. Each computational workload configuration indicates spatial assignments of the aggregate computational workload among a plurality of processing resources within the data center.

The configuration optimizer (191) includes computer program instructions that when executed by the processor (156) cause the computer (152) to carry out the step of calculating, for each computational workload configuration by the configuration optimizer (191), a total minimum energy consumption of the air conditioning units and the processing resources. A total minimum energy consumption of the air conditioning units and the processing resources is a value that indicates how much energy is consumed by the air conditioning units and the processing resources when the air conditioning units are operating at their most efficient configuration at a particular workload configuration of the processing resources. The air conditioning units can have different air conditioning unit configurations by turning on one or more air conditioning units; turning off one or more air conditioning units; changing the temperature of the airflow of one or more air conditioning units; and changing the fan speed of one or more of the air conditioning units. Calculating a total minimum energy consumption includes determining a lowest power air conditioning unit configuration of the air conditioning units that enables each air conditioning unit to consume the least amount of energy while maintaining a real-time inlet temperature of the air conditioning unit's thermal zone within a predetermined temperature range. A lowest power air conditioning unit configuration is the most efficient configuration of the air conditioning units. The predetermined temperature range may be a safe operating temperature range for the electrical components in the data center.

The configuration optimizer (191) also includes computer program instructions that when executed by the processor (156) cause the computer (152) to carry out the step of selecting, by the configuration optimizer (191), the computational workload configuration with the lowest total minimum energy consumption and the determined lowest power air conditioning unit configuration corresponding with the selected computational workload configuration. That is, the configuration optimizer (191) is configured to determine the optimal computational workload configuration and air conditioning unit configuration that maximizes utility of the data center while operating within a particular temperature range.

Also stored in RAM (168) is an operating system (154). Operating systems useful for provisioning aggregate computational workloads and air conditioning unit configurations to optimize utility of air conditioning units and processing resources within a data center according to embodiments of the present invention include UNIX™ Linux™ Microsoft XP™ AIX™ IBM's i5/OS™ and others as will occur to those of skill in the art. The operating system (154) and the configuration optimizer (191) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for provisioning aggregate computational workloads and air conditioning unit configurations to optimize utility of air conditioning units and processing resources within a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for provisioning aggregate computational workloads and air conditioning unit configurations to optimize utility of air conditioning units and processing resources within a data center according to embodiments of the present invention include modems for wired dial-up communications, Ethernet (IEEE 802.3) adapters for wired data communications network communications, and 802.11 adapters for wireless data communications network communications.

Figure 2:
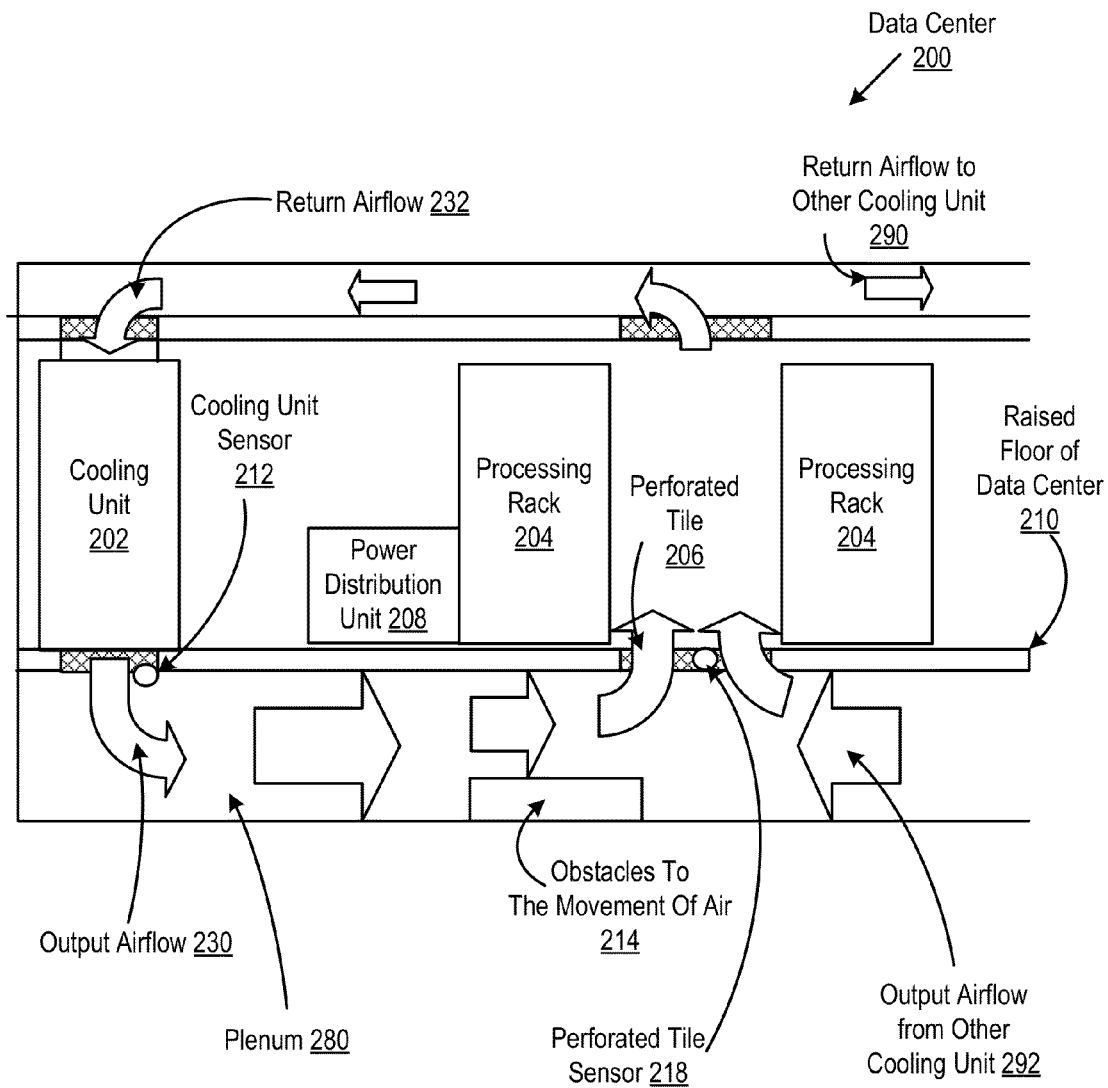
FIG. 2 sets forth a diagram of a data center operating according to embodiments of the present invention.

FIG. 2 sets forth a diagram of a data center (200) operating according to embodiments of the present invention. The data center (200) of FIG. 2 includes processing resources. Processing resources may include processing racks, power distribution units (PDU), and other types of energy consuming electrical devices commonly found in data centers for the processing of data. A processing rack is a configuration of electrical components, such as computer processors, data storage devices, servers, and power supplies. In the example of FIG. 2, the data center (200) includes processing racks (204) that receive power from a power distribution unit (PDU) (208). The data center (200) of FIG. 2 also includes an air conditioning unit (202) to generate an output airflow (230) that is directed into a plenum (280) beneath the raised floor (210) of the data center. In addition, the data center of FIG. 2 may also include an additional air conditioning unit (not shown) that can provide an output air flow (292) into the plenum (280) and receive a return airflow (290). The output airflow (230) flows from the plenum and through perforated tiles (206) into the area above the raised floor (210). The data center (200) of FIG. 2 also includes perforated ceiling tiles to allow return airflow (232) to travel back into the air conditioning unit (202). In this manner, the air conditioning unit (202) acts to cool the processing resources that generate heat.

Attached to the first air conditioning unit (202) is an air conditioning unit sensor (212) that is configured to measure the pressure of the output airflow (230) generated by the air conditioning unit (202). In addition, perforated tile sensors (218) are attached to the perforated tiles (206) in the data center (200) to measure the pressure drop across a particular perforated tile (206). The generated pressure measured by the air conditioning unit sensor (212) and the pressure drop measured by the perforated tiles (206) may be transmitted to the configuration optimizer (191) of FIG. 1.

The configuration optimizer (191) of FIG. 1 may use the generated pressure and the pressure drop to determine the thermal zones of the data center (200). A thermal zone is a region of a data center that a particular air conditioning unit cools. A region of the data center may indicate a two dimensional area of the data center floor or a three dimensional space that includes the space above the area of the data center floor. To determine a thermal zone, the configuration optimizer (191) of FIG. 1 may be configured to use the pressure drop information to determine which perforated tiles in the data center (202) are receiving the output airflow (230) from the air conditioning unit (202). All of the determined perforated tiles in the data center (202) that are receiving the output airflow from the air conditioning unit (202) are assigned by the configuration optimizer to the thermal zone of the first air conditioning unit (202). Although the data center (200) of FIG. 2 is illustrated with only a single air conditioning unit, the air conditioning unit (202), a data center may have more than one air conditioning unit and a configuration optimizer may be configured to determine multiple thermal zones, where each thermal zone corresponds to a particular air conditioning unit.

Figure 3:
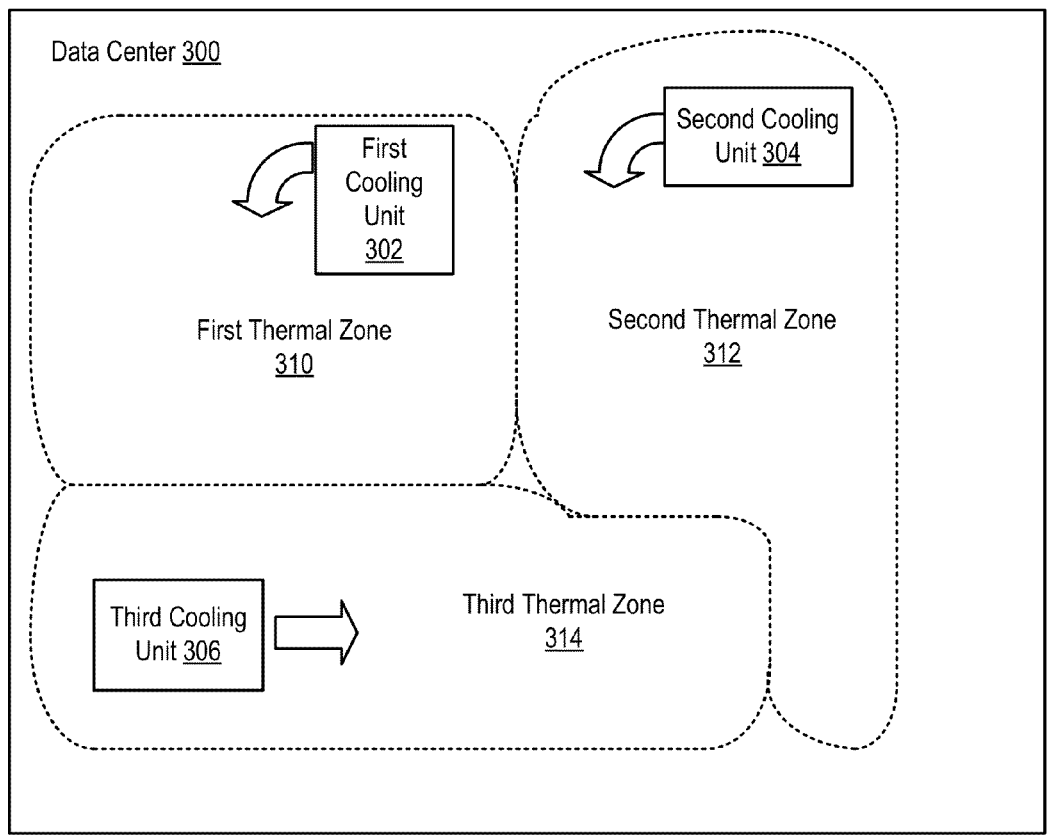
FIG. 3 sets forth a diagram of a data center with thermal zones determined according to embodiments of the present invention.

FIG. 3 sets forth a diagram of a data center (300) with thermal zones determined according to embodiments of the present invention. The data center (300) of FIG. 3 includes a first air conditioning unit (302), a second air conditioning unit (304), and a third air conditioning unit (306). A configuration optimizer, such as the configuration optimizer (191) of FIG. 1, may use pressure measurements from air conditioning unit sensors and perforated tile sensors to determine the thermal zones of each air conditioning unit. For example, when, according to the air conditioning unit sensors, the first air conditioning unit (302) is generating an output airflow and the second air conditioning unit (304) and third air conditioning unit (306) are not, the configuration optimizer may assign to a first thermal zone (310), each perforated tile that has a corresponding perforated tile sensor indicating a pressure drop. Likewise, a configuration optimizer may use the pressure drop information received from the air conditioning unit sensors and perforated tile sensors to determine which perforated tiles are within a second thermal zone (312) and a third thermal zone (314). Although the thermal zones in the example of FIG. 3 are represented by a particular contour, the thermal zones may include round edges or have other shapes and dimensions as will occur to one of skill in the art.

As part of the process for determining which regions of the data center correspond with a particular thermal zone, the configuration optimizer may be configured to calculate a velocity field indicating the trajectory of airflow generated by the air conditioning unit. To calculate the velocity field of the airflow, the configuration optimizer may utilize equations and principles of fluid dynamics. For example, the configuration optimizer may determine the trajectory of the airflow as a function of potential flow theory. Potential flow theory describes the velocity field as the gradient of a scalar function: the velocity potential.

To determine the velocity field under potential flow theory, the configuration optimizer may utilize the Poisson equation which is defined as:

$$\Delta\phi=f$$

In the Poisson equation, ($\Delta$) is the Laplace operator, and f and $\phi$ are real or complex-valued functions on a manifold. When the manifold is an Euclidean space, the Laplace operator is often denoted as $\nabla^2$ and so Poisson's equation is frequently written as:

$$\nabla^2\phi=f$$

where f is the source or sink of the potential. The gradient of the potential gives the velocity field v:

$$v=\nabla\phi$$

In this model, air conditioning units are treated as sources while perforated tiles in the raised floor of the data center are treated as sinks. The strengths of the sources are obtained in real-time from air conditioning unit sensors mounted on every air conditioning unit. The strengths of the sinks are calculated by correlating the pressure drop across a perforated tile to the flow resistance offered by the perforated tile.

The pressure drop across a perforated tile is obtained in real-time by perforated tile sensors placed in the plenum. That is, the configuration optimizer may use the measured strength of the air conditioning unit along with the recorded pressure drop within the plenum to generate a velocity field that indicates the trajectory of airflow generated by a particular air conditioning unit.

The configuration optimizer may further refine the velocity field of the airflow based on a model of how airflow is affected by the area of the particular plenum. That is, the configuration optimizer may determine how the airflow propagates and reflects off of the surfaces of the particular plenum and the objects within the plenum. For example, the configuration optimizer may utilize a ray tracing approach to determine how the particles within the airflow reflect off of electrical components, cords, wires within the plenum as well as the general surfaces of the plenum. Ray tracing is a method for calculating the path of waves or particles through a system with regions of varying propagation velocity, absorption characteristics, and reflecting surfaces. In this example, ray tracing indicates how particulars of the airflow change direction or reflect off surfaces within the plenum. Ray tracing solves the problem by repeatedly advancing idealized narrow beams called rays through the medium by discrete amounts. Simple problems can be analyzed by propagating a few rays using simple mathematics. More detailed analyses can be performed by using a computer to propagate many rays.

Once a velocity field indicating the trajectory of airflow for a desired air conditioning unit is obtained, thermal zones for a particular air conditioning unit setting are obtained by an algorithm which calculates the trajectory of the air flow using:

$$x = \int v dt$$

The configuration optimizer calculates a trajectory of the airflow until it either intersects with a cooling unit or with a previously assigned point. The configuration optimizer uses the calculated trajectory of the airflow to determine which areas of the data center receive airflow from a particular air conditioning unit. The configuration optimizer assigns the determined area to a particular thermal zone, which is then used for provisioning aggregate computational workloads and air conditioning unit configurations to optimize utility of air conditioning units and processing resources within a data center according to embodiments of the present invention.

Figure 4:
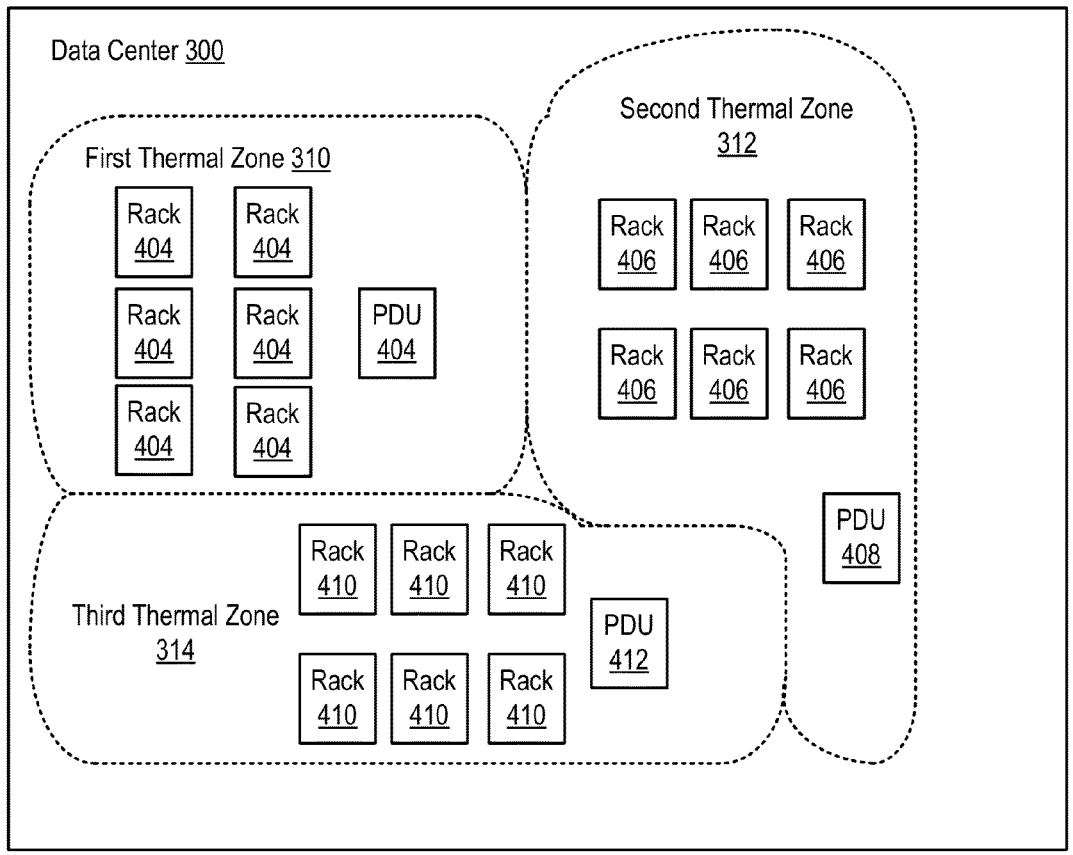
FIG. 4 sets forth a diagram of a data center with thermal zones determined according to embodiments of the present invention FIG. 5 sets forth a flow chart illustrating an exemplary method for provisioning aggregate computational workloads and air conditioning unit configurations to optimize utility of air conditioning units and processing resources within a data center according to embodiments of the present invention.

FIG. 4 sets forth a diagram of a data center (300) with thermal zones determined according to embodiments of the present invention. In the example of FIG. 4, the first thermal zone (310), the second thermal zone (312), and the third thermal zone (314) of the data center (300) of FIG. 3 are illustrated. For simplicity, the first air conditioning unit (302), the second air conditioning unit (304), and the third air conditioning unit (306) are not illustrated. However, in the example of FIG. 4, the processing resources of the data center (300) are illustrated.

As part of the process of using thermal zones for provisioning aggregate computational workloads and air conditioning unit configurations to optimize utility of air conditioning units and processing resources within a data center, a configuration optimizer may be configured to determine the processing resources of the different thermal zones. For example, the configuration optimizer may determine that the first computer processing racks (402) and a first power distribution unit (404) are near perforated tiles within the first thermal zone (310). The configuration optimizer may also assign the second computer processing racks (406) and second PDU (408) to the second thermal zone (312) and assign the third processing racks (410) and a third PDU (412) to the third thermal zone (314).

The configuration optimizer may also be configured to determine the amount of heat dissipated in the raised-floor area in a particular thermal zone. For example, the configuration optimizer may be configured to map each computer processing rack to its nearest PDU. Given this mapping, the configuration optimizer may assume that all computer processing racks are identical and may estimate the power dissipated by a given rack by determining the total power distributed by a PDU and the number of computer processing racks mapped to the PDU. The total power dissipated in a thermal zone above raised floor ($=P^d_{RF}$), can be found by adding the power dissipated in the processing racks ($=P^d_{IT}$), air conditioning units ($=P^d_{CRAC}$), PDUs ($=P^d_{PDU}$), and other assets ($=P^d_{Misc}$) which lie in that zone:

$$P^d_{RF} = P^d_{CRAC} + P^d_{PDU} + P^d_{IT}$$

The cooling power of an air conditioning unit for a thermal zone is calculated from the fluid volumetric-flow rate ($\phi$), air density ($\rho$), specific heat of the air ($C_p$), and the difference between the air inlet and the exit temperatures of the thermal zone ($\Delta T$):

$$P_{Cool} = \Sigma P_{i,Cool} = \Sigma \rho \phi_i C_p \Delta T$$

The configuration optimizer performs summation over all the perforated tiles in that thermal zone. Under steady state conditions, the total power dissipated in the thermal zone above the raised floor ($=P^d_{RF}$) should be equal to the total cooling power of the air conditioning unit, $P_{Cool}$. The relationship between the cooling power of the air conditioning units and the power dissipated by the processing resources may be defined by an energy balance equation such as:

$$P_{Cool} = P^d_{RF}$$

The configuration optimizer uses the energy balance equation to determine the temperature difference ($\Delta T$) across a particular thermal zone. The inlet temperature to the thermal zone is obtained using an air conditioning unit sensor mounted on a corresponding air conditioning unit. Using the energy balance equation above and the inlet temperature, the configuration optimizer may calculate the return temperature to the air conditioning unit for the thermal zone. The configuration optimizer may use the calculated return temperature as part of the determination of whether the real-time inlet temperature of a thermal zone is within a predetermined temperature range. As part of the process for determining optimized air conditioning unit configurations, the configuration optimizer uses the determination of whether a particular air conditioning unit configuration keeps all of the thermal zones within the predetermined temperature range.

Figure 5:
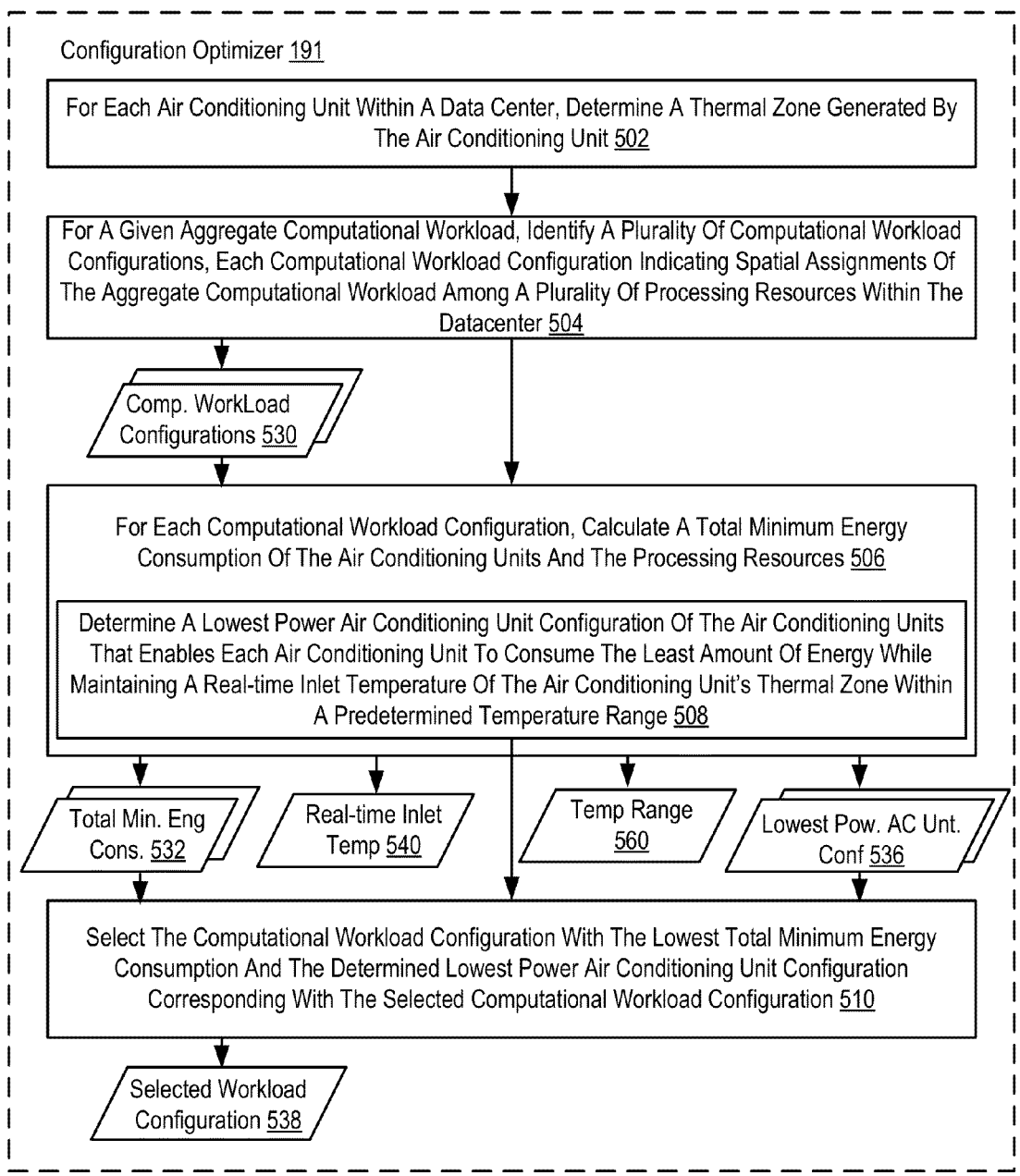

For further explanation, FIG. 5 sets forth a flow chart illustrating an exemplary method for provisioning aggregate computational workloads and air conditioning unit configurations to optimize utility of air conditioning units and processing resources within a data center according to embodiments of the present invention. The method of FIG. 5 includes for each air conditioning unit within the data center, determining (502), by a configuration optimizer (191), a thermal zone generated by the air conditioning unit. Determining (502) a thermal zone generated by the air conditioning unit may be carried out by calculating the strength of an air conditioning unit supplying an output airflow into a data center plenum; calculating pressure drops between the perforated tiles and the plenum; based on the strength of the air conditioning unit and the pressure drops across the perforated tiles, determining a trajectory of the airflow in the plenum; and based on the trajectory of the airflow, identifying the areas of the data center that are cooled by the particular air conditioning unit.

The method of FIG. 5 includes for a given aggregate computational workload, identifying (504), by the configuration optimizer (191), a plurality (530) of computational workload configurations. Each computational workload configuration indicates assignments of the aggregate computational workload among a plurality of processing resources within the data center. Assigning an aggregate computational workload among a plurality of processing resources, or 'load balancing' as it is sometimes called, is a computer networking methodology to distribute computational workloads across multiple computers or a computer cluster, network links, central processing units, disk drives, or other resources, to achieve optimal resource utilization, maximize throughput, minimize response time, and avoid overload. Using multiple components with load balancing, instead of a single component, may increase reliability through redundancy. Identifying (504) a plurality (530) of computational workload configurations may be carried out by determining for each processing resource, the available processing capacity of each processing resource as a percentage of the total processing capacity of the processing resource; determining which processes of the processing resources can be moved to other processing resources; and based on the available processing capacities of the processing resources, determining different configurations of the processing resources assigned with different computational workloads.

The method of FIG. 5 includes for each computational workload configuration, calculating (506), by the configuration optimizer (191), a total minimum energy consumption (532) of the air conditioning units and the processing resources. Calculating (506) a total minimum energy consumption (532) of the air conditioning units and the processing resources may be carried out by determining the energy consumption of the processing resources at a particular computational workload configuration; and determining the energy consumption of the air conditioning units at different configurations.

In the method of FIG. 5, calculating (506) a total minimum energy consumption (532) includes determining (508) a lowest power air conditioning unit configuration (536) of the air conditioning units that enables each air conditioning unit to consume the least amount of energy while maintaining a real-time inlet temperature (540) of the air conditioning unit's thermal zone within a predetermined temperature range (560). A real-time inlet temperature may be a server inlet temperature of a server on the floor of the data center; a temperature at a floor sensor; or any other temperature at a location within the data center. The predetermined temperature range (560) may correspond with the safe operating limits published by The American Society of Heating, Refrigerating and Air-Conditioning Engineers (ASHRAE). For example, a safe operating range for all IT equipment may be 65 degrees to 80 degrees Fahrenheit (18.3 degrees to 26.6 degrees Celsius). Determining a lowest power air conditioning unit configuration (536) of the air conditioning units that enables each air conditioning unit to consume the least amount of energy while maintaining a real-time inlet temperature (540) of the air conditioning unit's thermal zone within a predetermined temperature range (560) may be carried out by determining the real-time inlet temperature of each thermal zone when the air conditioning units are in a particular configuration and when the processing resources are operating at the computational workload configuration; and determining which air conditioning unit configuration requires the lowest amount of energy to operate while maintaining the temperature of the thermal zone within the predetermined range. Changing from one air conditioning unit configuration to another may be carried out by turning on one or more air conditioning unit; turning off one or more air conditioning unit; changing the temperature of the airflow of one or more air conditioning units; and changing the fan speed of one or more of the air conditioning units.

The method of FIG. 5 includes selecting (510), by the configuration optimizer (191), the computational workload configuration (538) with the lowest total minimum energy consumption and the determined lowest power air conditioning unit configuration corresponding with the selected computational workload configuration (538). Selecting (510) the computational workload configuration (538) with the lowest total minimum energy consumption and the determined lowest power air conditioning unit configuration corresponding with the selected computational workload configuration (538) may be carried out by storing, for each computational workload configuration, a value representing the energy consumed by the processing resources and the air conditioning units at the lowest power air conditioning unit configuration; comparing the stored energy values; and selecting the computational workload configuration with the corresponding lowest stored energy value.

Figure 6:
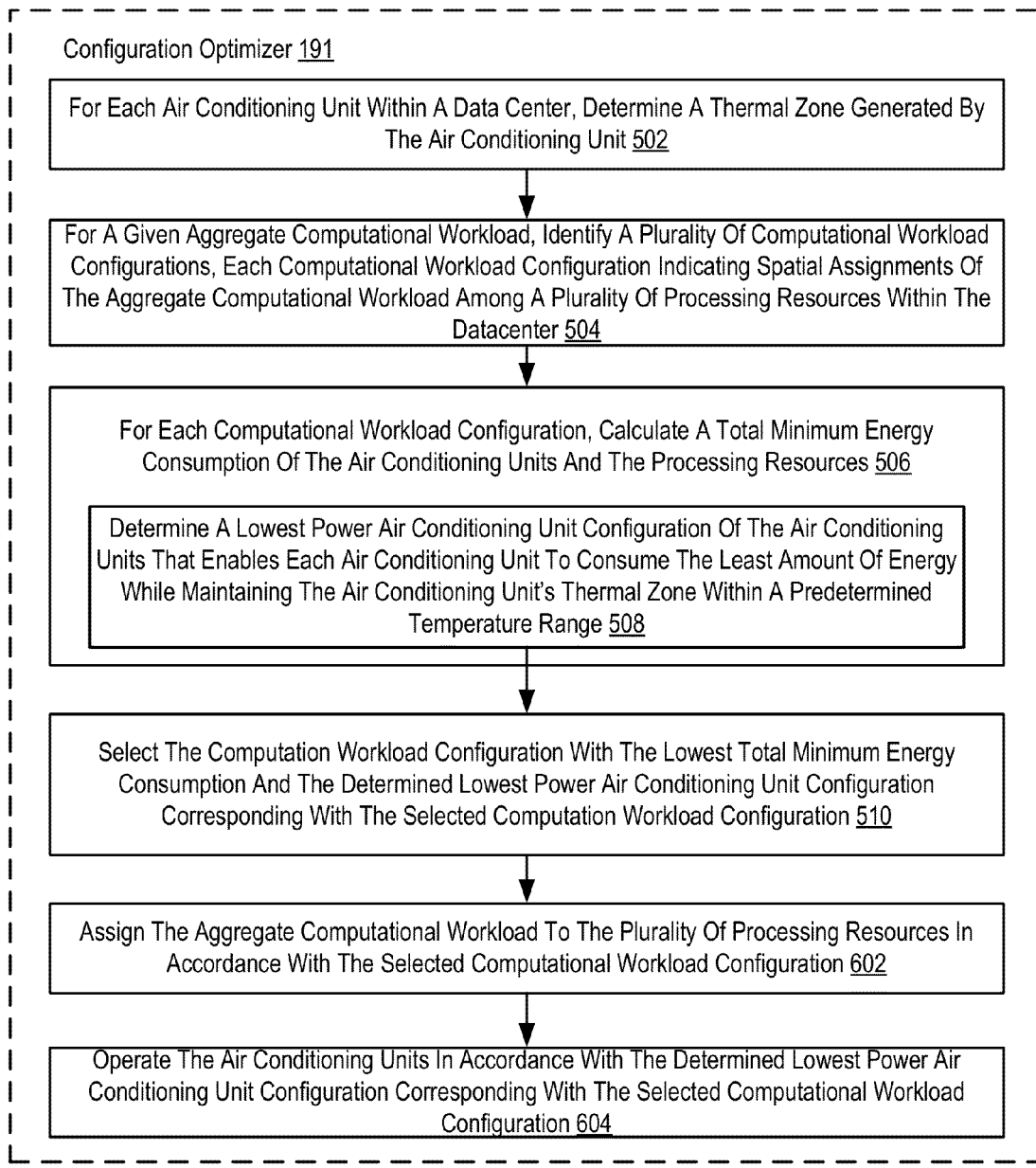
FIG. 6 sets forth a flow chart illustrating a further exemplary method for provisioning aggregate computational workloads and air conditioning unit configurations to optimize utility of air conditioning units and processing resources within a data center according to embodiments of the present invention.

For further explanation, FIG. 6 sets forth a flow chart illustrating a further exemplary method for provisioning aggregate computational workloads and air conditioning unit configurations to optimize utility of air conditioning units and processing resources within a data center according to embodiments of the present invention. The method of FIG. 6 is similar to the method of FIG. 5 in that the method of FIG. 6 also includes for each air conditioning unit within the data center, determining (502) a thermal zone generated by the air conditioning unit; for a given aggregate computational workload, identifying (504), by the configuration optimizer (191), a plurality (530) of computational workload configurations; for each computational workload configuration, calculating (506) a total minimum energy consumption (532) of the air conditioning units and the processing resources; determining (508) a lowest power air conditioning unit configuration (536) of the air conditioning units that enables each air conditioning unit to consume the least amount of energy while maintaining a real-time inlet temperature (540) of the air conditioning unit's thermal zone within a predetermined temperature range (560); and selecting (510) the computational workload configuration (538) with the lowest total minimum energy consumption and the determined lowest power air conditioning unit configuration corresponding with the selected computational workload configuration (538).

The method of FIG. 6, however, includes assigning (602), by the configuration optimizer (191), the aggregate computational workload to the plurality of processing resources in accordance with the selected computational workload configuration (538). Assigning (602) the aggregate computational workload to the plurality of processing resources in accordance with the selected computational workload configuration (538) may be carried out by moving one or more processes to one or more processing resources in accordance with the selected computational workload configuration.

The method of FIG. 6 also includes operating (604), by the configuration optimizer (191), the air conditioning units in accordance with the determined lowest power air conditioning unit configuration (536) corresponding with the selected computational workload configuration (538). Operating (604) the air conditioning units in accordance with the determined lowest power air conditioning unit configuration (536) corresponding with the selected computational workload configuration (538) may be carried out by turning on one or more air conditioning units; turning off one or more air conditioning units; changing the temperature of the airflow of one or more air conditioning units; and changing the fan speed of one or more of the air conditioning units.

Figure 7:
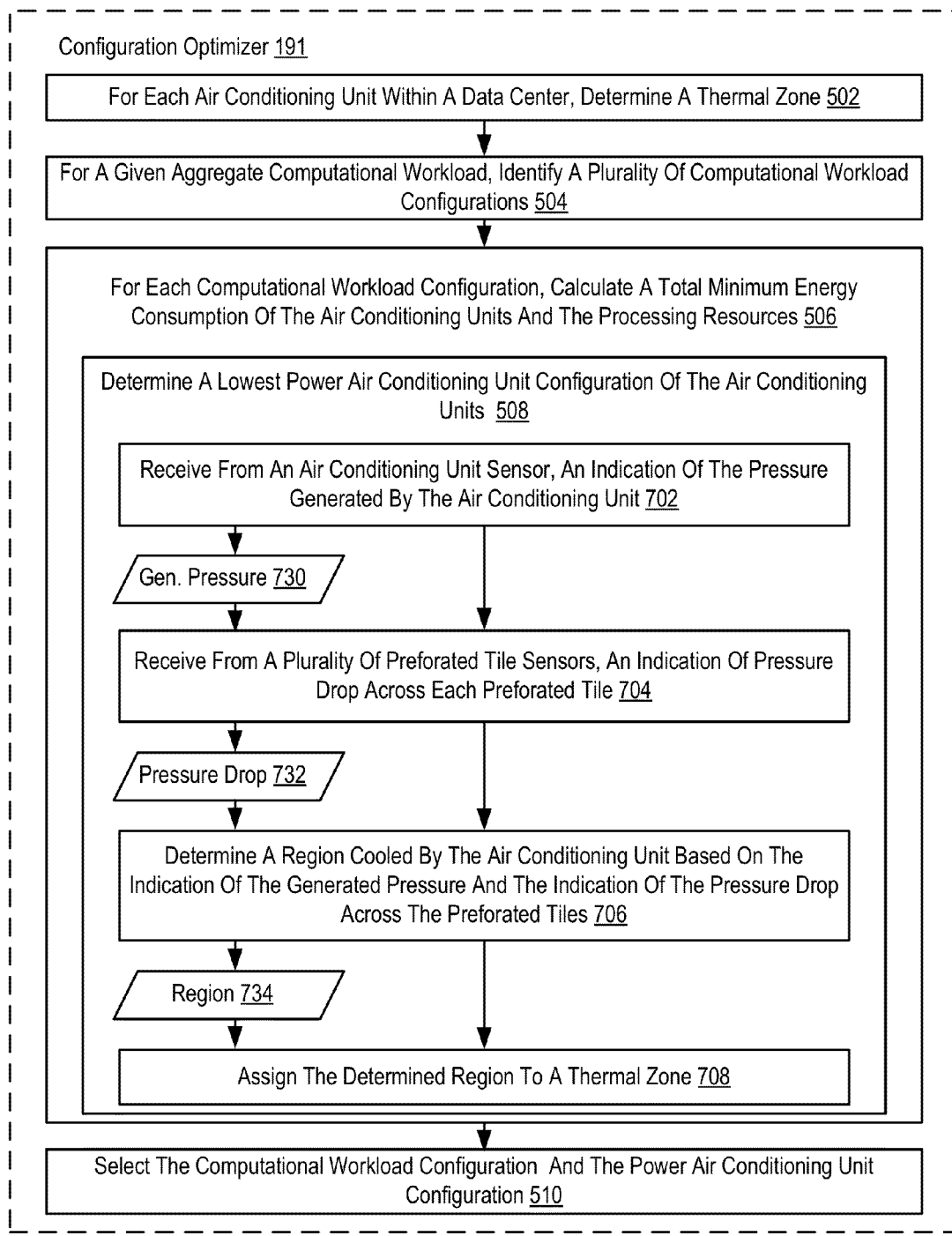
FIG. 7 sets forth a flow chart illustrating a further exemplary method for provisioning aggregate computational workloads and air conditioning unit configurations to optimize utility of air conditioning units and processing resources within a data center according to embodiments of the present invention.

For further explanation, FIG. 7 sets forth a flow chart illustrating a further exemplary method for provisioning aggregate computational workloads and air conditioning unit configurations to optimize utility of air conditioning units and processing resources within a data center according to embodiments of the present invention. The method of FIG. 7 is similar to the method of FIG. 5 in that the method of FIG. 7 also includes for each air conditioning unit within the data center, determining (502) a thermal zone generated by the air conditioning unit; for a given aggregate computational workload, identifying (504), by the configuration optimizer (191), a plurality (530) of computational workload configurations; for each computational workload configuration, calculating (506) a total minimum energy consumption (532) of the air conditioning units and the processing resources; determining (508) a lowest power air conditioning unit configuration (536) of the air conditioning units that enables each air conditioning unit to consume the least amount of energy while maintaining a real-time temperature (540) of the air conditioning unit's thermal zone within a predetermined temperature range (560); and selecting (510) the computational workload configuration (538) with the lowest total minimum energy consumption and the determined lowest power air conditioning unit configuration corresponding with the selected computational workload configuration (538).

In the method of FIG. 7, determining (508) a lowest power air conditioning unit configuration (536) of the air conditioning units includes receiving (702) from an air conditioning unit sensor, an indication (730) of the pressure generated by the air conditioning unit. Receiving (702) from an air conditioning unit sensor, an indication (730) of the pressure generated by the air conditioning unit may be carried out by measuring by the air conditioning unit sensor the pressure generated by the air conditioning unit; transmitting by the air conditioning unit sensor the measured pressure to the configuration optimizer; and storing by the configuration optimizer the received measured pressure.

In the method of FIG. 7, determining (508) a lowest power air conditioning unit configuration (536) of the air conditioning units includes receiving (704) from a plurality of perforated tile sensors, indications (732) of pressure drop across each perforated tile. Receiving (704) from a plurality of perforated tile sensors, indications (732) of pressure drop across each perforated tile may be carried out by measuring by the perforated tile sensor the pressure drop across a perforated tile; transmitting by the perforated tile sensor the measured pressure drop to the configuration optimizer; and storing by the configuration optimizer, the measured pressure drop.

In the method of FIG. 7, determining (508) a lowest power air conditioning unit configuration (536) of the air conditioning units includes determining (706) a region (734) cooled by the air conditioning unit based on the indication (730) of the generated pressure and the indications (732) of the pressure drop across the perforated tiles. Determining (706) a region (734) cooled by the air conditioning unit based on the indication (730) of the generated pressure and the indications (732) of the pressure drop across the perforated tiles may be carried out by: corresponding an indication of a pressure drop with a section of the raised floor; corresponding a region above the floor with the thermal zone; and grouping the corresponding sections of the raised floor of the data center into an area or a region of the data center to form a thermal zone.

In the method of FIG. 7, determining a lowest power air conditioning unit configuration (536) of the air conditioning units includes assigning (708) the determined region (734) to a thermal zone. Assigning (708) the determined region (734) to a thermal zone may be carried out by corresponding section of the area of the data center with a particular thermal zone; and storing the assignments in a thermal zone map.

Figure 8:
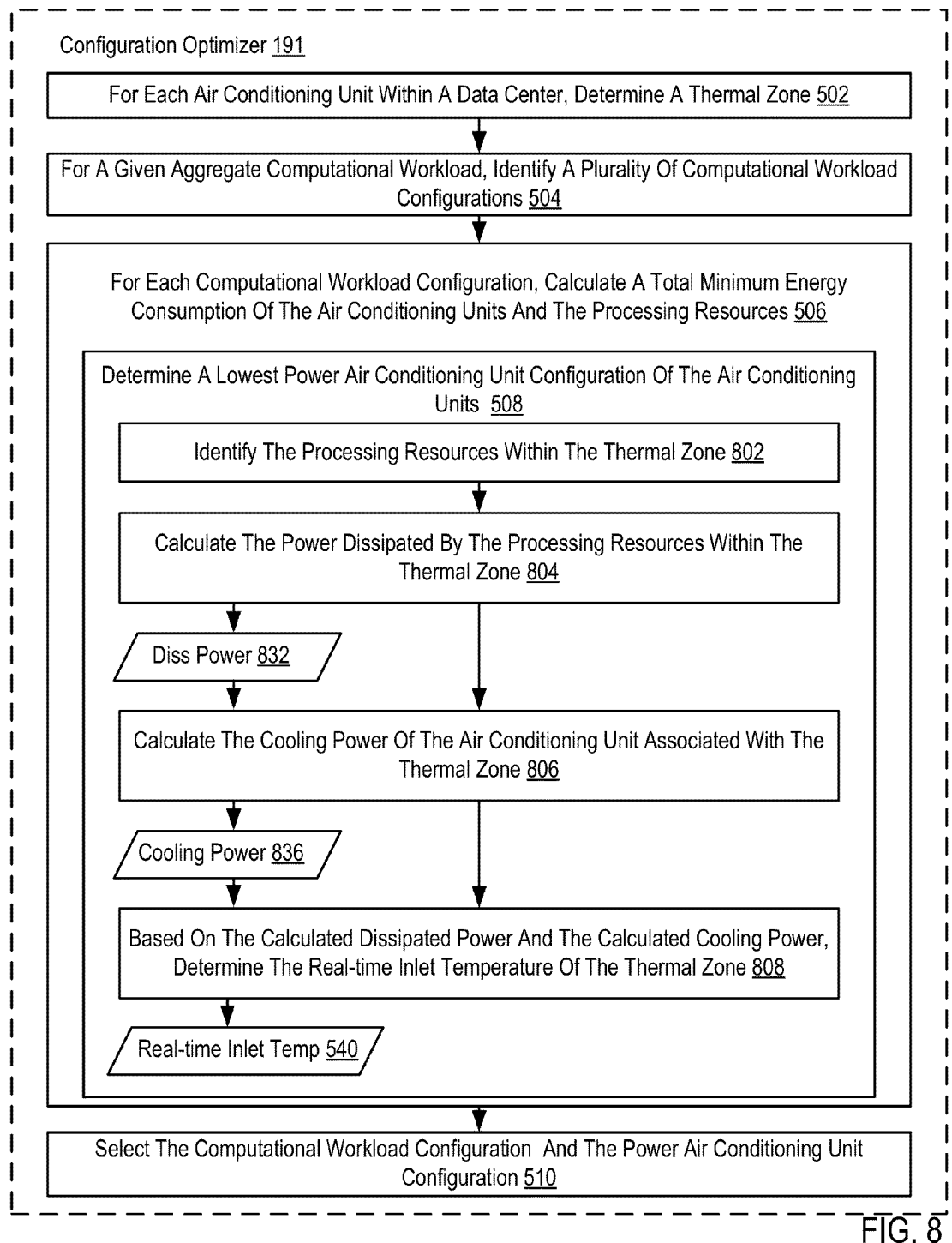
FIG. 8 sets forth a flow chart illustrating a further exemplary method for provisioning aggregate computational workloads and air conditioning unit configurations to optimize utility of air conditioning units and processing resources within a data center according to embodiments of the present invention.

For further explanation, FIG. 8 sets forth a flow chart illustrating a further exemplary method for provisioning aggregate computational workloads and air conditioning unit configurations to optimize utility of air conditioning units and processing resources within a data center according to embodiments of the present invention. The method of FIG. 8 is similar to the method of FIG. 5 in that the method of FIG. 8 also includes for each air conditioning unit within the data center, determining (502) a thermal zone generated by the air conditioning unit; for a given aggregate computational workload, identifying (504), by the configuration optimizer (191), a plurality (530) of computational workload configurations; for each computational workload configuration, calculating (506) a total minimum energy consumption (532) of the air conditioning units and the processing resources; determining a lowest power air conditioning unit configuration (536) of the air conditioning units that enables each air conditioning unit to consume the least amount of energy while maintaining a real-time inlet temperature (540) of the air conditioning unit's thermal zone within a predetermined temperature range (560); and selecting (510) the computational workload configuration (538) with the lowest total minimum energy consumption and the determined lowest power air conditioning unit configuration corresponding with the selected computational workload configuration (538).

In the method of FIG. 8, determining a lowest power air conditioning unit configuration (536) of the air conditioning units includes identifying (802) the processing resources within the thermal zone. Identifying (802) the processing resources within the thermal zone may be carried out by determining the area of the thermal zone; and corresponding locations of the processing resources with the areas in the thermal zones.

In the method of FIG. 8, determining a lowest power air conditioning unit configuration (536) of the air conditioning units includes calculating (804) the power dissipated (832) by the processing resources within the thermal zone. Calculating (804) the power dissipated (832) by the processing resources within the thermal zone may be carried out by determining the heat generated by each processing resource; and summing the heat generated by each processing resource determined to be within the thermal zone.

In the method of FIG. 8, determining a lowest power air conditioning unit configuration (536) of the air conditioning units includes calculating (806) the cooling power (836) of the air conditioning unit associated with the thermal zone. The cooling power (836) of the air conditioning unit is a cooling capacity of an air conditioning unit at a given configuration indicating fan speed, temperature and power supplied to an air conditioning unit. That is, the cooling power is a heat load that can be removed by the air conditioning unit at the give configuration. Calculating (806) the cooling power (836) of the air conditioning unit associated with the thermal zone may be carried out by determining the volumetric-flow rate of the air conditioning unit; determining the air density of the area about the raised floor of the data center; determining the specific heat of the air; determining the difference between the air inlet and the exit temperatures to the thermal zones; and multiplying each of the determined values.

In the method of FIG. 8, determining a lowest power air conditioning unit configuration (536) of the air conditioning units includes based on the calculated dissipated power (832) and the calculated cooling power (836), determining (808) a real-time inlet temperature (540) of the thermal zone. Determining (808) a real-time inlet temperature (540) of the thermal zone may be carried out by measuring with air conditioning unit sensors a real time inlet temperature; and using an energy balancing formula to determine the outlet temperature.

Figure 9:
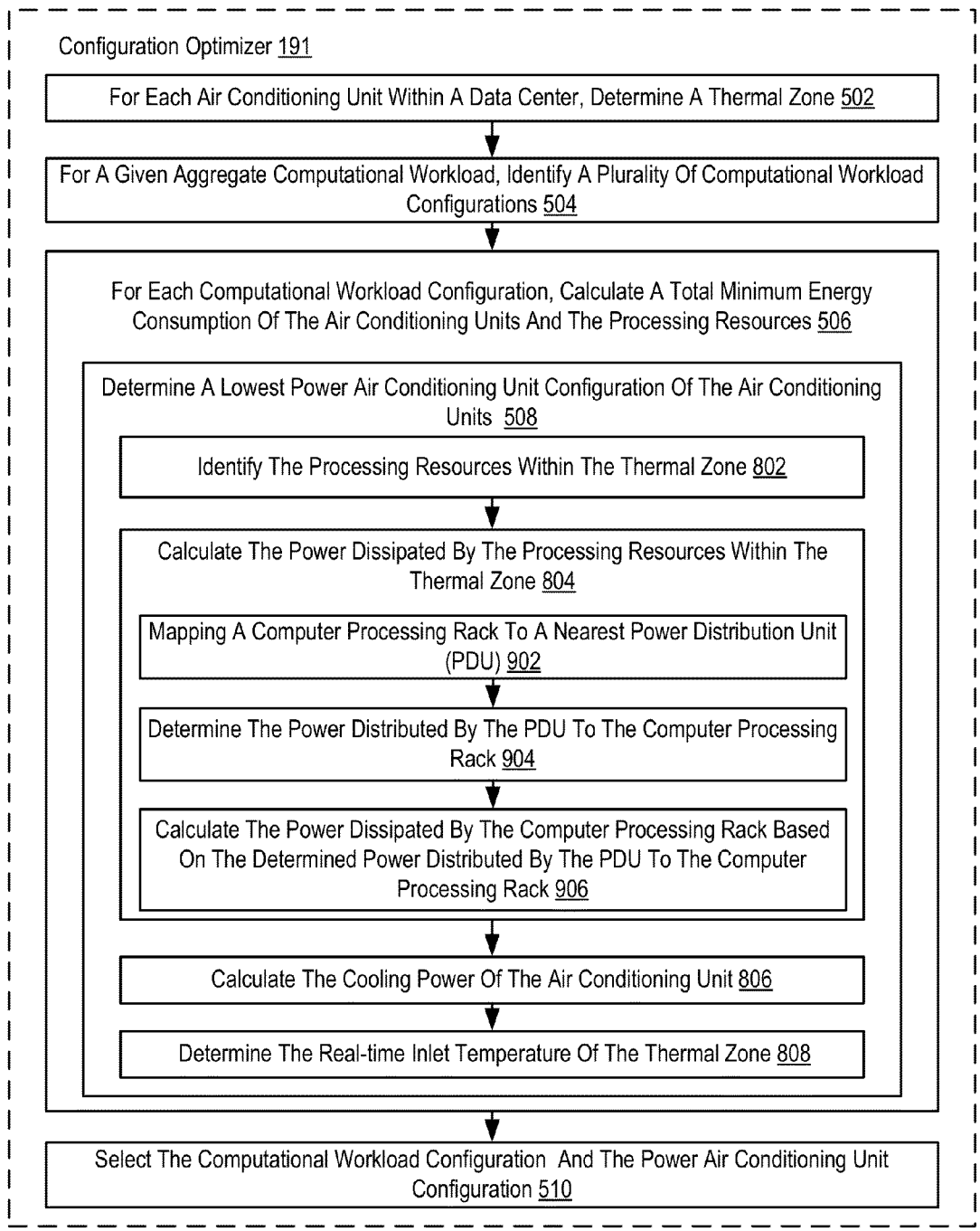
FIG. 9 sets forth a flow chart illustrating a further exemplary method for provisioning aggregate computational workloads and air conditioning unit configurations to optimize utility of air conditioning units and processing resources within a data center according to embodiments of the present invention.

For further explanation, FIG. 9 sets forth a flow chart illustrating a further exemplary method for provisioning aggregate computational workloads and air conditioning unit configurations to optimize utility of air conditioning units and processing resources within a data center according to embodiments of the present invention. The method of FIG. 9 is similar to the method of FIG. 5 in that the method of FIG. 9 also includes for each air conditioning unit within the data center, determining (502) a thermal zone generated by the air conditioning unit; for a given aggregate computational workload, identifying (504), by the configuration optimizer (191), a plurality (530) of computational workload configurations; for each computational workload configuration, calculating (506) a total minimum energy consumption (532) of the air conditioning units and the processing resources; determining a lowest power air conditioning unit configuration (536) of the air conditioning units that enables each air conditioning unit to consume the least amount of energy while maintaining a real-time inlet temperature (540) of the air conditioning unit's thermal zone within a predetermined temperature range (560); and selecting (510) the computational workload configuration (538) with the lowest total minimum energy consumption and the determined lowest power air conditioning unit configuration corresponding with the selected computational workload configuration (538).

The method of FIG. 9 is also similar to the method of FIG. 8 in that the method of FIG. 9 also includes: identifying (802) the processing resources within the thermal zone; calculating (804) the power dissipated (832) by the processing resources within the thermal zone; calculating (806) the cooling power (836) of the air conditioning unit associated with the thermal zone; and based on the calculated dissipated power (832) and the calculated cooling power (836), determining (808) a real-time inlet temperature (540) of the thermal zone.

In the method of FIG. 9, calculating (804) the power dissipated (832) by the processing resources within the thermal zone includes mapping (902) a computer processing rack to a nearest power distribution unit (PDU). Mapping (902) a computer processing rack to a nearest power distribution unit (PDU) may be carried out by determining the distance between each processing rack and PDUs within the data center; comparing the measured distances; and associating each computer processing rack with the PDU that is closest.

In the method of FIG. 9, calculating (804) the power dissipated (832) by the processing resources within the thermal zone includes determining (904) the power distributed by the PDU to the computer processing rack. Determining (904) the power distributed by the PDU to the computer processing rack may be carried out by measuring the power supplied to the PDU; receiving an indication of the measured power supplied to the PDU; and receiving an indication of power distributed by the PDU to each of the processing racks.

In the method of FIG. 9, calculating (804) the power dissipated (832) by the processing resources within the thermal zone includes calculating (906) the power dissipated by the computer processing rack based on the determined power distributed by the PDU to the computer processing rack. Calculating (906) the power dissipated by the computer processing rack based on the determined power distributed by the PDU to the computer processing rack may be carried out by determining the heat generation specifications of the computer processing rack; and determining the heat generated by the computer processing rack in accordance with the heat generation specifications and the amount of power supplied by the PDU to the particular computer processing rack.

Exemplary embodiments of the present invention are described largely in the context of a fully functional computer system for provisioning aggregate computational workloads and air conditioning unit configurations to optimize utility of air conditioning units and processing resources within a data center. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of provisioning aggregate computational workloads and air conditioning unit configurations to optimize utility of air conditioning units and processing resources within a data center, the method comprising:

for each air conditioning unit within the data center, determining, by a configuration optimizer, a thermal zone generated by the air conditioning unit, wherein the thermal zone comprises a volume of the data center, including processing components, supplied cooling by the air conditioning unit, wherein the processing components of the thermal zone comprise at least a plurality of racks;

for a given aggregate computational workload, identifying, by the configuration optimizer, a plurality of computational workload configurations, each computational workload configuration indicating spatial assignments of the aggregate computational workload among a plurality of processing resources within the data center;

for each computational workload configuration, calculating, by the configuration optimizer, a total minimum energy consumption of the air conditioning units and the processing resources, wherein calculating a total minimum energy consumption includes determining a lowest power air conditioning unit configuration of the air conditioning units that enables each air conditioning unit to consume the least amount of energy while maintaining a real-time inlet temperature of the air conditioning unit's thermal zone within a predetermined temperature range, wherein determining the lowest power air conditioning unit configuration further comprises:

identifying the processing resources within the thermal zone;

calculating the power dissipated by the processing resources within the thermal zone;

calculating the cooling power of the air conditioning unit associated with the thermal zone; and based on the calculated dissipated power and the calculated cooling power, determining a real-time inlet temperature of the thermal zone; and selecting, by the configuration optimizer, the computational workload configuration with the lowest total minimum energy consumption and the determined lowest power air conditioning unit configuration corresponding with the selected computational workload configuration, wherein selecting the determined lowest power air conditioning unit configuration includes performing at least one of turning on an air conditioning unit, turning off an air conditioning unit, changing a temperature of an air conditioning unit, and changing a fan speed of an air conditioning unit.

2. The method of claim 1 further comprising:
assigning, by the configuration optimizer, the given aggregate computational workload to the plurality of processing resources in accordance with the selected computational workload configuration; and
operating, by the configuration optimizer, the air conditioning units in accordance with the determined lowest power air conditioning unit configuration corresponding with the selected computational workload configuration.

3. The method of claim 1 wherein determining a thermal zone generated by the air conditioning unit includes:
receiving from an air conditioning unit sensor, an indication of the pressure generated by the air conditioning unit;
receiving from a plurality of perforated tile sensors, indications of pressure drop across each perforated tile;
determining a region within the data center cooled by the air conditioning unit based on the indication of the generated pressure and the indications of the pressure drop across the perforated tiles; and
assigning the determined region to a thermal zone.

4. The method of claim 1 wherein calculating the power dissipated by the processing resources within the thermal zone includes:
mapping a computer processing rack to a nearest power distribution unit (PDU);
determining the power distributed by the PDU to the computer processing rack; and
calculating the power dissipated by the computer processing rack based on the determined power distributed by the PDU to the computer processing rack.

5. The method of claim 1 wherein the predetermined temperature range indicates the temperatures within which the processing resources of the data center are recommended to operate.

6. The method of claim 1 wherein the plurality of processing resources include at least one of power distribution units, power supplies, and computer processing racks.

* * * * *